United States Patent [19]

Röhm

[11] Patent Number: 4,730,837
[45] Date of Patent: Mar. 15, 1988

[54] JAW CHUCK FOR WORKPIECES HAVING A PLURALITY OF PROCESSING AXES

[76] Inventor: Günter H. Röhm, Heinrich-Röhm-Str. 50, 7927 Sontheim, Fed. Rep. of Germany

[21] Appl. No.: 811,100

[22] Filed: Dec. 19, 1985

[30] Foreign Application Priority Data

Dec. 21, 1984 [DE] Fed. Rep. of Germany ....... 3446826

[51] Int. Cl.⁴ .............................................. B23B 31/14
[52] U.S. Cl. ............................................ 279/5; 279/6; 409/224
[58] Field of Search .................. 279/5, 6, 4; 408/150; 409/168, 224

[56] References Cited

U.S. PATENT DOCUMENTS

| | | | |
|---|---|---|---|
| 1,820,812 | 8/1931 | Longnecker et al. | 279/5 |
| 3,357,711 | 12/1967 | Fischer | 279/6 |
| 3,630,536 | 12/1971 | Scharten | 279/5 |
| 3,879,045 | 4/1975 | Benjamin et al. | 279/5 |
| 3,880,437 | 4/1975 | Scharten | 279/5 |

FOREIGN PATENT DOCUMENTS 268853 3/1913 Fed. Rep. of Germany .......... 279/6

Primary Examiner—Z. R. Bilinsky
Attorney, Agent, or Firm—Karl F. Ross; Herbert Dubno

[57] ABSTRACT

The chuck has a mounting body with an associated chuck assembly and a pivot device. For clamping of a workpiece at least one chucking jaw can adjustably be swung away from its chuck assembly, and the clamped workpiece, together with the chucking jaws can be turned about a pivot axis which extends perpendicularly with respect to the axis of rotation of the operational spindle of the lathe and with respect to the axes of operation of the workpiece, into pivot positions determined by the directions of the axes of operation. For workpieces with a pair of axes of operation, which are disposed at a distance with respect to one another, the mounting body is comprised of a base member and a turning member. The turning member is journaled for rotation at the base member so as to be able to revolve about a turning axis which extends parallel to the axis of rotation of the operational spindle and which intersects the pivot axis at predetermined distance. The turning member can be locked at the base member in the two turning positions, in which the two axes of operation cross the pivot axis.

13 Claims, 3 Drawing Figures

JAW CHUCK FOR WORKPIECES HAVING A PLURALITY OF PROCESSING AXES

FIELD OF THE INVENTION

My present invention relates to a jaw chuck for machining, for example on a lathe, workpieces which are to have a plurality of machining axes, especially mutually crossing or transverse axes of operation for example, valve (armature) housings. A machining axis is, for the purposes of the invention, an axis about which the workpiece is rotated in a turning or facing operation.

BACKGROUND OF THE INVENTION

A jaw chuck can have a mounting body which can be connected to the drive or headstock spindle of a lathe for rotation about a machining axis, and an associated pivot assembly or unit.

For clamping or similar retention of a respective workpiece, chuck jaws are provided. The clamped workpiece can be moved, together with the chuck jaws, about a pivot axis, to thereby alter the machining axis of the workpiece in conformity with the directions of the axes of operation, or processing planes, of the workpiece.

This pivot axis, in turn, extends perpendicularly (a) with respect to the axis of rotation of the main or operational spindle and (b) with respect to the axes of operation of the respective workpiece.

It has been shown, for example in German Patent Nos. 1,214,974 and 2,128,618 or in German Patent Publication (DE-OS) No. 1,930,870 in hitherto known swinging-type chucks of this type that the axis of rotation of the mounting body and the axes of operation of the respective workpiece are disposed in a common plane, i.e. are not skew to one another. The pivot device is then adapted to serve in such a way so as to align the respective tool with its axes of operation in sequence and parallel with respect to the axis of rotation, without necessitating re-mounting or re-clamping of the workpiece.

Such options, however, are not available for workpieces in which the axes of operation are spaced from one another at a given distance of separation. Accordingly, in the case of a retained or clamped workpiece having one of its axes of operation aligned in the axis of rotation, the other axis is positioned outside and away from the axis of rotation and perpendicularly to the pivot or swing axis and, as a consequence, it is not possible to bring, by way of a corresponding rotation or turning of the workpiece, this axis of operation into the axis of rotation of the mounting body.

This problem is particularly pronounced for armature or valve housings which could not be machined heretofore with two axes in spaced relation without rechucking.

OBJECT OF THE INVENTION

It is accordingly an object of my invention to provide an improved chuck of the type previously described which is capable of manipulating or handling workpieces having axes of operation which are separated by a predetermined distance with a single clamping operation.

SUMMARY OF THE INVENTION

This object is attained in accordance with the invention in that for workpieces having at least two axes of operation, or processing planes, which are disposed at a distance with respect to one another, the mounting body includes a base member and a turning member. The base member is equipped with a coupling device for connecting it to the drive spindle of the lathe, or similar machine tool. The turning member carries a jaw assembly or unit, and it carries a pivot unit.

The turning member is journaled for rotation on the base member and can revolve or turn with respect to a turning axis which extends parallel to the machining axis, i.e. the axis of the headstock spindle. This axis of rotation, i.e. the turning axis, intersects the pivot axis of the chucking jaws at the distance equal to one-half of the spacing between the two axes of operation. The turning member can be selectively locked on the base member in one of at least two turning positions, in which the two axes of operation cross the mentioned pivot axis.

In general terms, the respective workpiece which is held between the jaws of the apparatus is initially positioned with one of its axes being aligned with the axis of rotation of the respective operational spindle, and it is then processed, machined or treated in this attitude. The turning member is then rotated or moved through 180°, and the workpiece attains a position in which the other, second, axis is aligned with the mentioned axis of rotation. Accordingly, merely by a rotation of the workpiece about the pivot axis, until this second axis extends in the axis of rotation, any further treatment or processing of the workpiece can proceed under full consideration of this axis or plane of operation, assuming of course that the workpiece has been rotated through, say 90°, about the pivot axis.

Only in special cases—when the axes of operation are parallel with respect to one another—will a pivot motion be superfluous and the respective turning motion alone be sufficient to bring the second axis of processing into alignment with the respective axis of rotation.

Because the subdivision of the mounting body affects only this part of the chuck, the invention can be implemented independently of the particular detailed configuration of the jaws, the clamping device, and the pivot device, as may be desired for a particular workpiece.

Accordance with a feature of the invention, the chuck is provided with an arcuate piston chamber and a vane position connected to the turning member. This piston chamber can extend in the base member and be concentric with respect to the turning axis. Preferably the piston chamber has an angular extent in conformity with the desired angle of rotation of the turning member on the base. As well means are provided which allow the supply of the fluid pressure medium selectively on either side of the vane piston the piston chamber can be contacted by a pressure medium. In accordance with the pressurizing cycle, the vane piston and the associated turning member can be selectively moved in one or the other (clockwise or counterclockwise) turning direction.

According to another feature of the invention, the turning member has a hollow flanged shaft which extends coaxially with respect to the turning axis. This flanged shaft is journaled in an annular space of the base member, and it carries the mentioned vane piston. The flanged shaft is surrounded in the annular space by a sleeve formed with annular grooves open outwardly in the direction of the flanged shaft. Distributor passages in the base member and the hollow shaft or turning member communicate via the grooves for delivery of the respective pressure media for the vane piston, the pivot and the chuck jaws.

It is thus preferred that annular channels be provided in the circumferential surfaces which face one another of the journal pin and the distributor. These channels can be axially sealed with respect to each other and are connected to pressure medium channels extending in the base member and in the turning member for the supply of pressure medium to the chuck assembly or unit and the pivot device or unit.

A lock bolt or indexing pin serves to fix or limit the turning movement of the base member, which lock bolt is displaceable axially on the base member. Correspondingly, lock retainers or seats are provided on the turning body in conformity with the selected or indexed turning positions of the lock bolt and the lock bolt can be selectively introduced into the retainers.

The lock bolt can be actuated by an axial piston which can be shifted in a cylinder chamber of the base member, and which can be selectively fed on both sides with a pressure medium.

For giving a positive indication of its position, the lock bolt is connected to a driver which is in axial engagement with a control sleeve which, in turn, extends coaxially with respect to the axis of rotation of the base member. The control sleeve, as well, is guided in the base member so as to be shiftable in axial direction, but is precluded from rotation, and it projects some distance from the base member into the hollow headstock spindle. In conformity with the position and attitude of the control sleeve a signal can then readily be passed to an operator or to a monitoring means.

For compensation of imbalances—arising due to the eccentric arrangement of the base member and the turning member—the base member carries a counterbalance or counterbalancing weight which, with respect to the axis of rotation, is carried on that side which lies opposite the turning axis.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
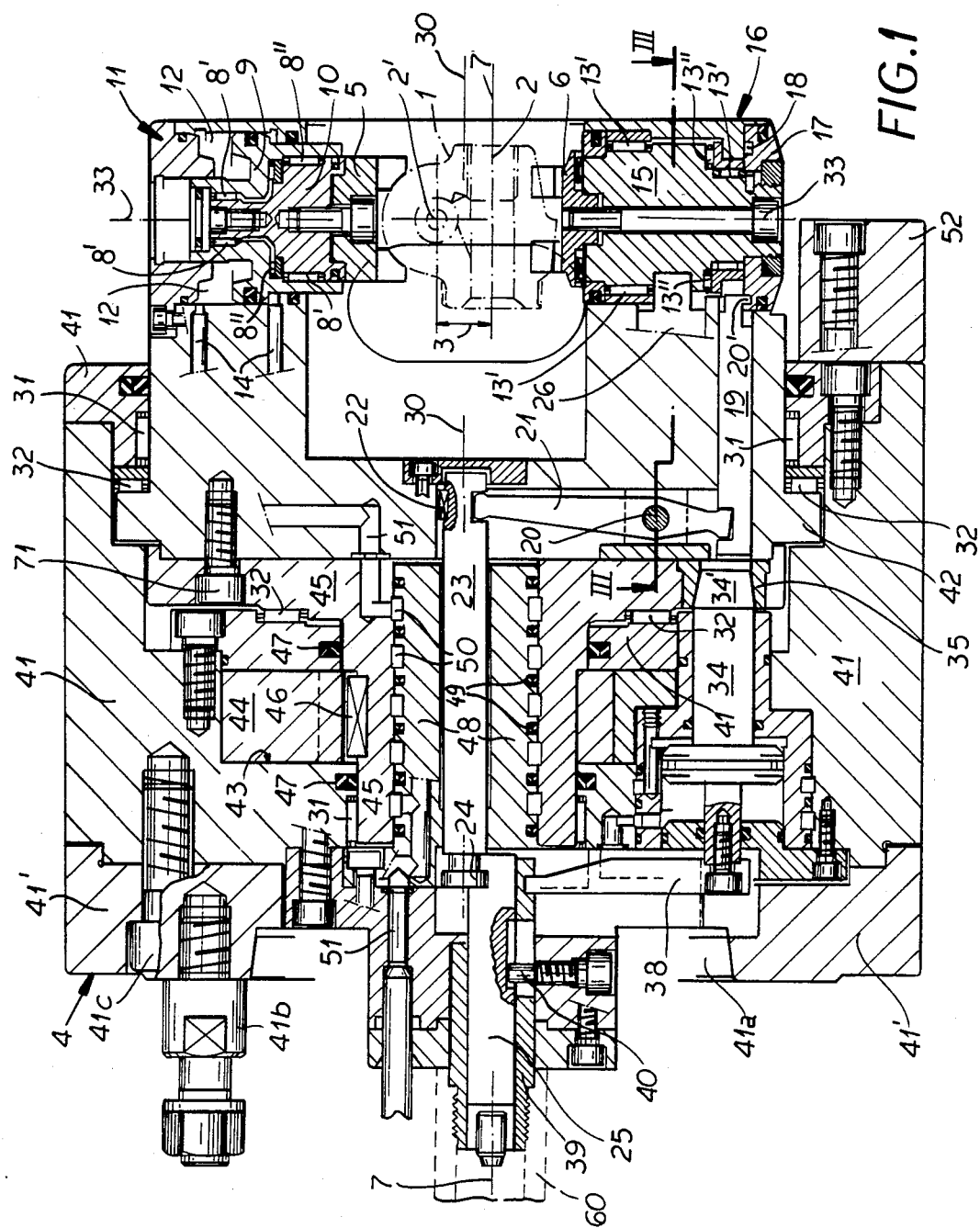
FIG. 1 is cross section along line I—I in FIG. 2 through the chuck.
Figure 2:
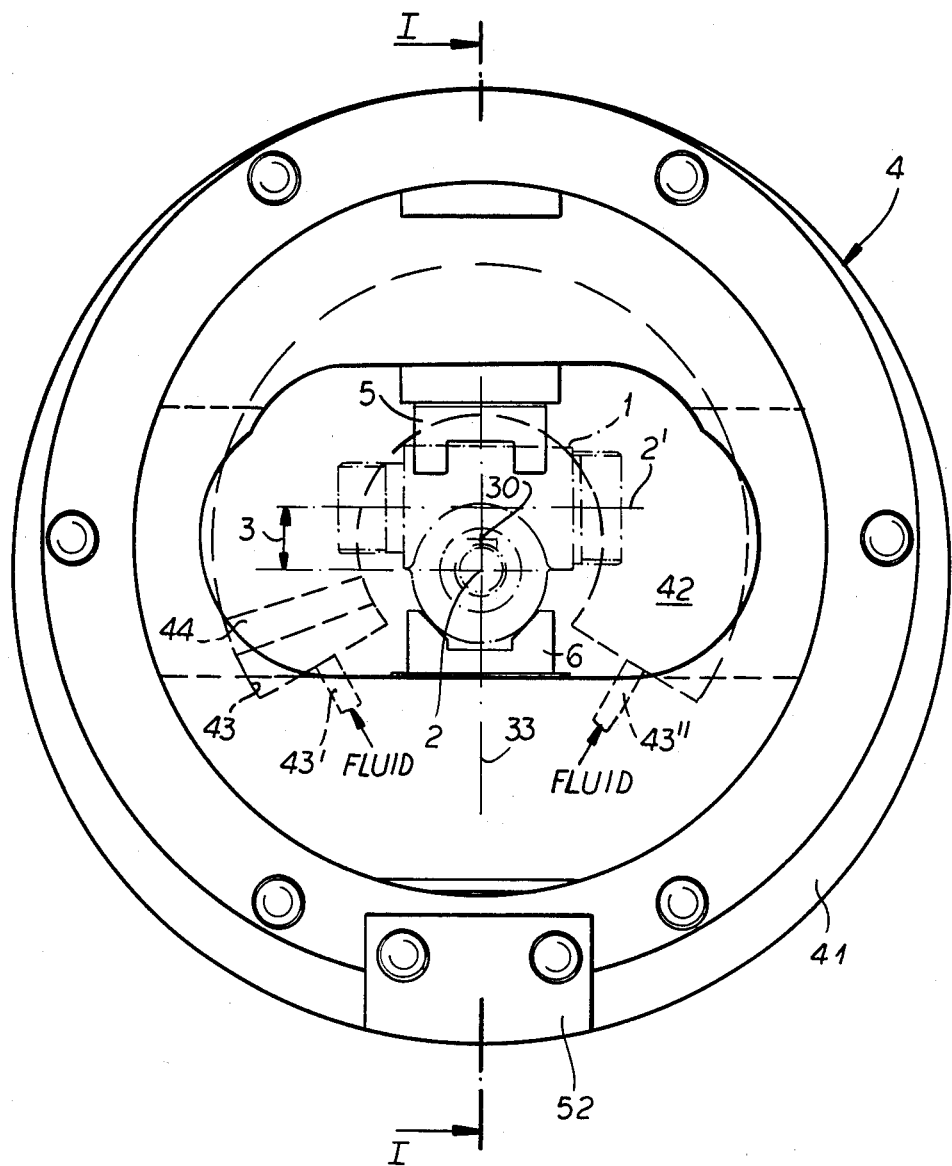
FIG. 2 is an end view of the chuck at the end where the workpiece is mounted.

The jaw chuck shown in the drawing serves to clamp workpieces for machining thereof. More particularly, the apparatus can be used with a lathe or the like machine tool which works on such workpieces to machine it with respect to two or more axes of operation, i.e. axes about which the workpiece is rotated for machining. Two such axes are generally identified by reference numerals 2 and 2', with the two axes crossing one another at a predetermined distance, as is indicated in FIGS. 1 and 2 by the doubleheaded arrow 3. The chuck has a mounting body 4.

The mounting body 4 can be connected at its lefthand end to an operational or work spindle 60, of a headstock of a lathe or similar machine, not shown. The mounting body 4 has two chucking elements or jaws 5 and 6 which are diametrically opposite one another with respect to the axis of rotation 7 of the mounting body 4. The two chuck jaws 5 and 6 clamp between them the workpiece 1. The two chuck jaws 5 and 6 are arranged so that they can be replaced, say for a different workpiece, due to wear and, of course, they are adapted with their configuration to the respective workpiece 1.

The chucking jaw 5 is mounted on a holder 10 which is journaled, by of radial bearings 8', for example needle bearings, in the clamping piston 9 of a chuck assembly or chuck unit which is generally identified by reference numeral 11. The chucking jaw 5 is also axially supported with respect to the clamping piston 9 by way of axial bearings 8".

The clamping piston 9 can move radially with respect to the axis of rotation 7 in a clamping cylinder 12 or similar chamber which is connected at both sides of the clamping piston 9 to pressure medium conduits 14 by way of which the clamping piston 9 can be selectively pressurized on either one of its sides by the respective pressure medium.

The chucking jaw 6 is replaceably held on the pivot shaft 15 of a pivot device or unit which is generally identified by reference numeral 16, with the pivot shaft 15 being journaled in a radial bearing 13' so as to be able to turn with respect to a pivot axis 33 in the housing of the pivot device 16.

The chucking jaw 6 is also journaled by an axial bearing 13" with respect to the clamping force of the chucking jaw 5. The pivot axis 33 is also the axis of rotation for the holder 10, and the chucking jaws 5 and 6 can be coaxially aligned with and can turn or swing with respect to this pivot axis 33.

The pivot shaft 15 is connected so that it rotates with, but not independently of, a ring 17. This ring 17 has a curved or planar cam formation 18 for controlling the action of a control piston or rod 19. The control piston 19 engages with a nose or similar formation 20' at the curved formation 18. The rotation of the pivot shaft 15 causes, via the curved formation 18, an axial shifting or displacement of the control piston 19, and the control piston 19 correspondingly moves a pivoting lever 21 at the point or center 20.

The pivoting lever 21 is journaled in the mounting body 4. This pivoting or tilt lever 21, in turn, adjusts the position of a rod 23 which is axially shiftable in the mounting body 4, but is otherwise precluded from rotating by means of a tongue or key and groove connection 22.

The rod 23 engages at end 24 axially with a bolt or similar pin 25 which is coaxially arranged with respect to the axis of rotation 7 of the mounting body 4. The bolt 25 is adapted to project for connecting it in the hollow drive spindle 60 of the lathe or the like tool machine to some indicator of position of the pivot shaft 15 about the axis 33. The swinging movement and the position of the pivot shaft 15 is thus expressed in the final analysis in corresponding axial movements and positions of the bolt 25, and the indications of the respective positions and/or attitudes of the shaft 15 can be monitored and utilized through the hollow drive spindle.

Figure 3:
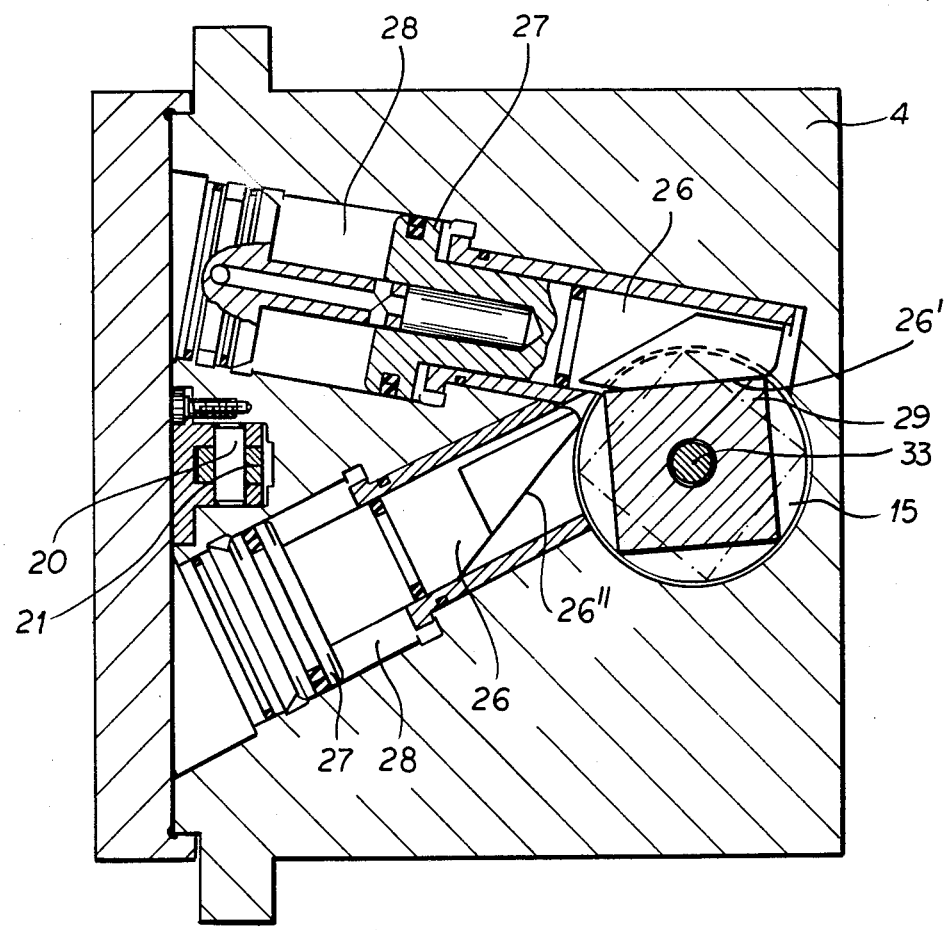
FIG. 3 is a cross section along line III—III in FIG. 1.

Pivot or swing actuation rods 26 (FIGS. 1 and 3) serve to index the pivot shaft 15. As is indicated in greater detail in FIG. 3, the pivot or swing actuation rods 26 are arranged in the mounting body 4 and can be moved in the respective longitudinal direction. They are also offset, with respect to their longitudinal axes, by a fraction of the pivot angle of the pivot shaft 15.

They are respectively connected to a control piston 27 which is movable in a cylinder chamber 28.

The control pistons 27 can be supplied at both sides selectively with a pressure medium. The swing-actuation rods 26 act—under the effect of the pressure medium—in sequence upon a four-sided element 29 which is formed on the pivot shaft 15; or which is connected thereto by way of a respective transmission or drive. Accordingly, the pivot or swing actuating rods 26, when actuated or contacted by the pressure medium via the respective wedges surfaces 26', 26''. in the final analysis not only effect a pivoting/swinging movement of the pivot shaft 15, the chucking jaws 6 connected thereto. and the workpiece 1, but also a locking of these components.

The pivoting or swinging movement of the pivot shaft 15, and the locking, is in increments of 90° into respective pivot positions, and is in consideration of the fact that the two axes of operation 2 and 2' of the workpiece 1 are disposed perpendicularly with respect to one another. When the two axes 2 and 2' define an angle other than 90°, the pivot or swing positions of the pivot shaft 15 are correspondingly selected, and locked, due to the adjustment movements of the pivot or swing actuation rods 26.

The mounting body 4 is subdivided into a base member 41 and a turning member 42. The base member 41 is comprised of several interconnected components and carries the associated connector or coupling device for connecting it to the drive or operational spindle 60. More particularly, it has a chuck flange 41' having a conical receiver, such as opening 41a and connecting bolts or rods 41b. The chuck flange 41' is connected by means of threaded fasteners 41c to the remaining portion of the base member 41.

The turning member 42 carries the chuck assembly or unit 11 and the pivot device or unit 16. It is journaled at the base member 41 to rotate through at least 180° with respect to a turning axis 30 which extends substantially parallel to the axis of rotation 7. The turning member 42 is also journaled so that it cannot move axially with respect to the base by the radial bearings 31 and the axial bearings 32.

The turning axis 30 intersects the pivot axis 33 at a distance which is equal to one half of the distance 3 between the two axes 2 and 2' of a workpiece 1. Thus, the axis of rotation 2, the turning axis 30, and the pivot axis 33 can be respectively positioned in a common plane. In the two turning positions, which are separated from each other by 180°, and in which the two axes 2 and 2' intersect the pivot axis 33 (FIG. 2), the turning member 42 can be locked at the base member 41 by a lock pin 34 which can be axially displaced in the base member 41.

The turning member 42 has corresponding conical openings, seats or lock retainers 35 which can receive, in accordance with its turning position—which are to be indexed, locked or fixed—by the lock bolt. These retainers 35 are formed by conical hollow sleeves which can be engaged by the frustoconical end of the lock bolt 34.

The lock retainers 35 are open conically towards the lock bolt 34 which engages with its correspondingly conically formed lock head 34' in the selected lock retainer. 35.

This engagement causes an adjustment of the turning position of the turning member 42 with respect to the base member 41. The lock bolt 34 is connected to an axial piston 36 which can be displaced in a cylinder or similar chamber 37 of the base member 41, and which can be supplied at both ends by a pressure medium. Accordingly, the axial piston 36 can—in conformity with the control of the pressure medium—be removed from the respective lock retainer 35, or can be pressed thereinto.

For reporting its selected position, the lock bolt 34 is connected to a driver 38 which engages a control sleeve 39 which, in turn, extends coaxially with respect to the axis of rotation 7 of the base member 41. The control sleeve 39 surrounds the bolt or pin 25 in coaxial manner. The control sleeve 39 can be shifted on the base member 41 and is guided by way of a screw 40, but it cannot rotate. The control sleeve 39 projects, as does the bolt or pin 25, from the base member 41 into the hollow operational or drive spindle 60. Accordingly, the position of the lock bolt 34 can be reported or indicated by the control sleeve 39 externally of the body 41, in a manner similar as that report or position indication which is achieved by the bolt 25 in the case of the respective pivot position of the pivot shaft 15, and this is transmitted through the operational or drive spindle 60 and sensed or monitored in proper manner.

The turning member 42 is actuated by a piston/cylinder assembly which includes a piston chamber 43 which extends in and in its longitudinal direction concentrically with respect to the base member 41 and with respect to the turning axis 30. A vane piston 44 is arranged in the piston chamber 43, and the piston 44 is positively secured or keyed to the turning member 42, for example by a key and groove connection 46.

The piston chamber 43 has an angular or arcuate extent which corresponds generally to an angle of the magnitude of the angle of turning or pivoting of the turning member 42. The piston chamber 43 is also provided with fluid passages 43',43'' so as to be able to be selectively contacted on opposite sides of the vane piston 44 by a pressure medium.

In accordance with the control of the pressure medium, the vane piston 44, and with it the turning member 42, is moved selectively in one or the other direction of rotation or turning about the turning axis 30. In detail, the turning member 42 is connected to a hollow flanged shaft 45 by fasteners 71.

The flanged shaft 45 extends coaxially with respect to the turning axis 30 and into a corresponding annular space of the base member 41. The flanged shaft 45 carries the vane piston 44 which is connected so as not to rotate by means of a key and groove connection 46. The piston chamber 43 forms an annular groove which is open in the direction of the flanged shaft 45 and which is sealed at 47 with respect to the shaft 45.

A hollow distributor formation or member 48, which is fixed at the base member 41, reaches into the hollow shaft 45. The rod 23 is introduced and guided in the central hollow space of the distributor member 48 which also extends coaxially with respect to the turning axis 30.

Ring channels 50 are provided in the facing circumferential surfaces of the shaft 45 and in the distributor member 48, which are axially sealed with respect to each other at 49. The ring channels or annular channels 50 are connected to pressure medium supply channels 51 which extend for the supply of the pressure medium to the chuck unit 11 and the pivot unit 16 in the base member 41 and in the turning member 42. These supply channels 51 are distributed about the circumference of the distributor member 48 and the shaft 45, respectively, and only one of these supply channels 51 can be seen in FIG. 1.

A counterbalance or counterbalancing weight 52 is arranged at the base member 41 on the other, lower side of axis of rotation 7. This counterbalancing weight 52 compensates for oscillations arising due to the eccentricities of the axis of rotation 7 and the turning axis 30.

When the workpiece 1 is worked on after being clamped in the jaws 5 and 6 shown in FIGS. 1 and 2—in which the axis 2 is aligned with the axis of rotation 7—the turning member 42 is moved with respect to the turning axis 30 and in relation to the base member 41 through an angle of 180°, and the workpiece 1 also turns with respect to the turning axis 30 through an angle of 180°. The axis 2' previously disposed outside of the axis of rotation 7 now intersects the axis of rotation 7, but the axis 2 previously lying in the axis of rotation 7 is displaced by twice the distance between the turning axis 30 and the axis of rotation 7.

Subsequently, by means of the pivot unit 16, the workpiece 1 is turned through 90°, and the axis 2' is aligned with the axis of rotation 7. The other axis 2, under consideration of which the workpiece 1 was already worked on, then is positioned in the position previously occupied by the axis 2'—now disposed in the axis of rotation 7.

In a special case—with parallel axes 2 and 2'—there will be sufficient rotation of the turning member 42 about the turning axis 30 by 180°, without further pivot movements of pivot shaft 15, in order to selectively bring the two axes 2 and 2' into alignment with the axis of rotation 7.

I claim:

1. A chuck for holding a workpiece rotatable about a machining axis of rotation for performing machining operations with respect to at least two workpiece axes, disposed at a distance from one another, said apparatus comprising:
   a mounting body connectable to a machine-tool spindle, said mounting body including a base member for coupling said mounting body to said spindle, and a turning member adapted to be locked at said base member at least in a first position and a second position, whereby in each of said positions said workpiece axes intersect a pivot axis perpendicular to said machining axis;
   a chuck unit on said turning member for clamping said workpiece;
   a pivot unit on said turning member for rotating the clamped workpiece relative to said turning member about said pivot axis;
   journal means for rotation of said turning member on said base member about a turning axis parallel to the machining axis intersecting said pivot axis midway between said workpiece axis, said chuck unit including a pair of chuck jaws clamping said workpiece between them and journal means for journaling said jaws relative to said turning member about said pivot axis, said journal means including:
   a piston chamber formed in said base member extending arcuately about said turning axis;
   a vane piston displaceable in said piston chamber and connected to said turning member; and
   means for supplying a pressure medium to said piston chamber for selectively pressuring said vane piston on opposite sides thereof.

2. The chuck defined in claim 1 wherein said journal means further comprises:
   a hollow flanged shaft having at least one circumferential surface, said flanged shaft being connected to said turning member and extending coaxially with respect to said turning axis, said flanged shaft carrying said vane piston, said hollow flanged shaft being at least in prt surrounded by said piston chamber which is formed open in the direction of the hollow flanged shaft;
   a distributor member adapted to engage said hollow flanged shaft, said distributor member being adapted to form at least part of said base member, and having at least one circumferential surface;
   wherein said at least one circumferential surface in said hollow flanged shaft and in said distributor member face one another;
   for the distribution of a respective pressure medium, annular channel means in the facing circumferential surfaces which are axially sealed with respect to each other; and
   conduit means for supplying a respective pressure medium to said chuck unit and said pivot unit, said conduit means extending in said base member and in said turning member.

3. The chuck defined in claim 1, further comprising:
   a lock bolt axially displaceable on said base member; and
   lock bolt seats on said turning member selectively engageable by said bolt for indexing said turning member in position.

4. The chuck defined in claim 3 wherein said lock bolt is connected to an axially guided piston which can be shifted in a respective cylinder chamber of said base member and which can be supplied on opposite sides with a pressure medium.

5. A chuck for holding a workpiece rotatable about a machining axis of rotation for performing machining operations with respect to at least two workpiece axes, disposed at a distance from one another, said apparatus comprising:
   a mounting body connectable to a machine-tool spindle, said mounting body including a base member for coupling said mounting body to said spindle, and a turning member adapted to be locked at said base member at least in a first position and a second position, whereby in each of said positions said workpiece axes intersect a pivot axis perpendicular to said machining axis;
   a chuck unit on said turning member for clamping said workpiece;
   a pivot unit on said turning member for rotating the clamped workpiece relative to said turning member about said pivot axis;
   journal means for rotation of said turning member on said base member about a turning axis parallel to the machining axis intersecting said pivot axis midway between said workpiece axis;
   a lock bolt axially displaceable on said base member;
   lock bolt seats on said turning member selectively engageable by said bolt for indexing said turning member in position;
   a control sleeve extending coaxially with said machining axis which is guided in said base member so as to be shiftable and precluded from rotating relative thereto, and which is adapted to project from said base member; and a driver axially engaged with said control sleeve and connected to said lock bolt so that an axial position of said sleeve indicates the position of said lock bolt.

6. The chuck defined in claim 5, further comprising: at least one counterbalancing weight mounted on said base member on a side thereof, opposite said turning axis with reference to said machining axis.

7. In a chuck for a lathe for the machining of a workpiece (1) with respect to two crossing operation axes (2,2'), comprising a mounting body (4) provided with means for connecting the mounting body to an operational spindle of a lathe, a chuck assembly (11) on the body (4) and a pivot device (16) for the chuck assembly, said chuck assembly having at least one chucking jaw (5) for clamping the workpiece (1), said chucking jaws (5,6) being angularly displaceable about a pivot axis (33) which extends perpendicularly with respect to a machining axis of rotation (7) of the operational spindle and with respect to the operation axis (2,2') of the workpiece (1) into pivot positions determined by the directions of the axes of operation (2,2'), the improvement wherein for (1) workpieces with two operation axes (2,2') which are disposed at a distance (3) from one another, the mounting body (4) is subdivided into a base member (41) equipped with a coupling device for attachment to said spindle, and into a turning member (42) which carries the chuck assembly (11) and the pivot device (16), means being provided for mounting the turning member (42) rotatably at the base member (41) so as to be able to revolve about a turning axis (30) which extends parallel to said machining axis (7) and which intersects the pivot axis (33) at the distance of half the distance (3) away from the axis of rotation (7), and means for locking the turning member (42) to the base member in two turning positions in which the two axes of operation (2,2') cross the pivot axis (33),
  said turning member (42) being provided a piston chamber (43) which extends concentrically in the base member (41) with reference to the axis of rotation (30), in which extends a vane piston (44) which is connected to the turning member (42), whereby the piston chamber (43) extends at least over the angle of turning of the turning member (42), and the piston chamber (43) on both sides of the vane piston (44) can be supplied with a pressure medium to rotate said turning member.

8. The improvement defined in claim 7 wherein the turning member (42) has a hollow journal pin (45) which extends coaxially with respect to the axis of rotation (30), is journaled in the annular space of the base member (41), carries the vane piston (44), and is surrounded by the piston chamber (43) which is formed as an annular grove open in the direction of the journal pin (45) for this purpose, that in the journal pin (45) engages a distributor formation (48) of the base member (41), and that in the circumferential surface which face one another of the journal pin (45) and the distributor formation (48) there are provided annular channels (50) axially sealed with respect to each other which are connected to pressure medium channels (51) extending in the base member (41) and in the turning member (42) for the supply of pressure medium to the chuck assembly (11) and the pivot device (16).

9. In a chuck for a lathe for the machining of a workpiece (1) with respect to two crossing operation axes (2,2'), comprising a mounting body (4) provided with means for connecting the mounting body to an operational spindle of a lathe, a chuck assembly (11) on the body (4) and a pivot device (16) for the chuck assembly, said chuck assembly having at least one chucking jaw (5) for clamping the workpiece (1), said chucking jaws (5,6) being angularly displaceable about a pivot axis (33) which extends perpendicularly with respect to a machining axis of rotation (7) of the operational spindle and with respect to the operation axes (2,2') of the workpiece (1) into pivot positions determined by the directions of the axes of operation (2,2'), the improvement wherein for (1) workpieces with two operation axes (2,2') which are disposed at a distance (3) from one another, the mounting body (4) is subdivided into a base member (41) equipped with a coupling device for attachment to said spindle, and into a turning member (42) which carries the chuck assembly (11) and the pivot device (16), means being provided for mounting the turning member (42) rotatably at the base member (41) so as to be able to revolve about a turning axis (30) which extends parallel to said machining axis (7) and which intersects the pivot axis (33) at the distance of half the distance (3) away from the axis of rotation (7), and means for locking the turning member (42) to the base member in two turning positions in which the two axes of operation (2,2') cross the pivot axis (33),
  an axially adjustable lock bolt (34) guided in said base member, turning position lock retainers (35) for engagement with the lock bolt (34) being provided in the turning body (42) in conformity with the locking positions,
  the lock bolt (34) for reporting its position being connected to a driver (38) which is in axial engagement with a control sleeve (39) which extends coaxially with respect to the axis of rotation (7) of the base member (41), which is guided in the base member (41) so as to be shiftable and non-rotary and projects from the base member (41) into the hollow operational spindle.

10. The improvement defined in claim 9 wherein the lock bolt (34) is connected to an axial piston (36) which can be shifted in a cylinder chamber (37) of the base member (41) and which can be supplied at both sides with a pressure medium.

11. The improvement defined in claim 9 wherein the base member (41) carries a counterbalancing weight (52) on the side which extends opposite to the axis of rotation (30) of the axis of rotation (7).

12. A jaw chuck for clamping a workpiece having a plurality of processing axes, comprising:
  a base member rotatable about an axis of rotation;
  a turning member journaled on said base member for rotation about a turning axis parallel to said axis of rotation so that said turning axis intersects said processing axes perpendicular to said processing axes;
  means on said base member for rotating said turning member about said turning axis;
  a pivot unit on said turning member having a pair of jaws engageable with said workpiece and pivotable about a pivot axis perpendicular to said rotation and turning axes; and
  mechanical remote indicating means for indicating a position of said pivot axis mounted on said turning member and said base member, said remote indicating means including:
    a control piston axially movable in said turning member parallel to said axis of rotation, a tilt lever swingable on said turning member and engaging said control piston at one end of said tilt lever, a rod axially movable on said base member along said turning axis engaged by another end of said tilt lever, a pin axially coupled to said rod, said pin lying along said axis of rotation and having indication positions relating to the position of said pivot shaft, and means for connecting said pin to a position indicator.

13. A chuck jaw for clamping a workpiece having a plurality of processing axes comprising:

a base member rotatable about an axis of rotation;

a turning member journaled on said base member for rotation about a turning axis parallel to said axis of rotation so that said turning axis intersects said processing axes perpendicular to said processing axes, said turning member being formed with a plurality of conical recesses opening in the direction of said base member centered on turning axis and having axes parallel to said turning axis;

means on said base member for rotating said turning axis;

a pivot unit on said turning member having a pair of jaws engageable with said workpiece and pivotable about a pivot axis perpendicular to said rotation and turning axes;

a lock bolt axially shiftable on said base member and alignable with a selected one of said recesses for engagement therein, said lock bolt having a frusto-conical end fitting in said one of recesses; and a cylinder formed in said base member receiving said piston and provided with means for hydraulically pressurizing said cylinder to displace said piston in opposite directions.

* * * * *